United States Patent
Schwengler

(10) Patent No.: US 9,066,224 B2
(45) Date of Patent: Jun. 23, 2015

(54) MULTI-ANTENNA DISTRIBUTION OF WIRELESS BROADBAND IN A BUILDING

(71) Applicant: CenturyLink Intellectual Property LLC, Denver, CO (US)

(72) Inventor: Thomas Schwengler, Lakewood, CO (US)

(73) Assignee: CenturyLink Intellectual Property LLC, Denver, CO (US)

( * ) Notice: Subject to any disclaimer, the term of this patent is extended or adjusted under 35 U.S.C. 154(b) by 270 days.

(21) Appl. No.: 13/657,330

(22) Filed: Oct. 22, 2012

(65) Prior Publication Data

US 2014/0113671 A1     Apr. 24, 2014

(51) Int. Cl.
   *H04H 20/71*    (2008.01)
   *H04W 16/00*    (2009.01)

(52) U.S. Cl.
   CPC ................................. *H04W 16/00* (2013.01)

(58) Field of Classification Search
   CPC ................................................. H04W 16/00
   USPC .......... 455/3.01, 446, 426.1, 426.2, 517, 11.1
   IPC .................................................... H04W 16/00
   See application file for complete search history.

(56) References Cited

U.S. PATENT DOCUMENTS

| | | | |
|---|---|---|---|
| 6,781,477 B1 | 8/2004 | Stancil | |
| 6,801,753 B1* | 10/2004 | Keong | 455/3.01 |
| 6,980,768 B2* | 12/2005 | Arend et al. | 455/3.01 |
| 8,428,550 B2* | 4/2013 | Larsen | 455/404.2 |
| 2003/0047390 A1 | 3/2003 | Crenella et al. | |
| 2011/0028157 A1 | 2/2011 | Larsen | |
| 2013/0028218 A1 | 1/2013 | Chun et al. | |
| 2014/0112166 A1 | 4/2014 | Schwengler | |

OTHER PUBLICATIONS

U.S. Appl. No. 13/657,349; Non-Final Office Action dated Feb. 27, 2015; 43 pages.

\* cited by examiner

*Primary Examiner* — Sanh Phu
(74) *Attorney, Agent, or Firm* — Swanson & Bratschun, L.L.C.

(57) ABSTRACT

The disclosed embodiments include methods and systems for distributing a broadband wireless signal in a building. The disclosed methods and systems feature a wireless broadband transmitter associated with multiple base antennas, where the base antennas are inserted into one or more ducts of the ventilation system of the building. Communication between the transmitter and receivers within the building may be optimized by selecting, modifying or controlling a configuration parameter of at least one of the multiple base antennas to enhance distribution of the wireless broadband signal within the ducts of the ventilation system and between the transmitter and device receivers.

18 Claims, 8 Drawing Sheets

MULTI-ANTENNA DISTRIBUTION OF WIRELESS BROADBAND IN A BUILDING

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to systems and methods for distributing wireless broadband signals throughout a building and more particularly to the use of optimized multi-antenna distribution methods and systems in conjunction with using the building HVAC ducts as a waveguide system.

BACKGROUND

The wireless distribution of broadband signals within a building is becoming commonplace. Wi-Fi is now the most common way people access the Internet. Smart phones compliant with 3G and 4G standards are commonly used inside buildings. Personal computers, laptop computers, cellular phones, tablet computers, PDAs and other portable devices are typically configured to receive a wireless broadband signal. In addition, televisions, DVD players, Blu-ray disc players, smart thermostats, printers, copiers and many other digitally enabled home or business appliances are configured for wireless network access. To meet the needs of these and similar devices, many buildings now include a wireless access point (WAP), base station or repeater connected to a local or external network to send and receive data or communication signals to and from wireless devices within or near the building.

Prior to the advent of local wireless networks, a home or business owner was required to run cables through walls and ceilings to deliver network access to any network enabled devices within the building. Now, a building owner may have wired access to the Internet, a LAN or another network at one specific location within a building and simply install a wireless router or other type of WAP to more easily extend the network to end-user devices. A WAP is built to support a standard for sending and receiving data using radio frequencies. The standards and the designated transmission frequencies used are defined by the IEEE. Many wireless access points use the 802.11a/b/g/n, or 802.11ac/ad standard.

Other types of networks, cellular telephone networks for example, feature a wireless signal originating outside of the building. The walls, floors and other structures of the building can attenuate or degrade the original wireless signal sufficiently to cause access problems for cellular telephone users within a building. Thus, femtocells, wireless repeater devices, or other wireless network elements can be installed within a building to transmit certain wireless signal locally. Many of these wireless network elements use LTE, or LTE Advanced standards One problem with the transmission of wireless broadband signals within a building is difficulty obtaining a sufficiently strong communication channel between the WAP or repeater and various receiving devices. For example, the popular Wi-Fi standard defined in IEEE 802.11b is a low powered solution (less than 1 W) having a range of no more than 300 feet from the transmitter. The closer a receiving device is to the transmitter the better chance the receiver will have of connecting and typically the faster the Wi-Fi uplink/downlink performance will be. Connectivity and signal strength problems can be exacerbated by the walls, floors, ceilings and other surfaces or barriers present in a typical building which can cause signal attenuation and reflection.

One solution to this problem is to provide duplicate WAPs distributed throughout a building with each WAP directly connected to the wired network or repeater. This solution however involves the cost and inconvenience of duplicate WAPs and additional cabling. Another solution is the use of wireless range extenders or signal boosters Another solution to the problem of insufficiently reliable communication between a WAP and various receiving devices is based upon advanced antenna technology. For example, multiple input/multiple output (MIMO) is a wireless technology which employs multiple intelligent radio antennas to improve transmission speed and the quality of wireless network transmissions over longer distances than might otherwise be possible. Enhanced antenna technology may certainly improve the reliability, speed and range of wireless broadband communication within a building. Nonetheless, any wireless system will at some point be limited by the distance between the WAP and wireless devices, which limitations are exacerbated by the walls, floors, ceilings and other surfaces or structures always present in a building.

U.S. Pat. No. 6,980,768 teaches the use of a building ventilation system as a waveguide to enhance the distribution of a spread spectrum signal within a building, in particular a code division multiple access (CDMA) telecommunications signal. The U.S. Pat. No. 6,980,768 describes how the ducts of a conventional ventilation system can operate as waveguides. Bends, kinks, rough surfaces, splits, and variations in duct size or configuration will inevitably cause fading in any RF signal transmitted through a duct waveguide. The spread spectrum nature of the signal described in the U.S. Pat. No. 6,980,768 provides little opportunity for transmission optimization within a ventilation system. Hence, there is a need for solutions that can overcome some or all of the technical hurdles identified above to allow the effective distribution and optimization of the distribution of broadband wireless signals in a building.

BRIEF SUMMARY

Certain embodiments disclosed herein include methods of distributing a broadband wireless signal in a building. The disclosed methods include the steps of providing a transmitter operatively associated with multiple base antennas, where the base antennas are inserted into one or more ducts of the ventilation system of the building. In addition, the methods may include providing one or more receivers operatively associated with one or more devices having device antennas. The receivers may be devices such as cellular telephones, computers or other wireless enabled apparatus located anywhere in or near the building. Communication between the transmitter and receivers may be optimized by selecting, modifying or controlling a configuration parameter of at least one base antenna to enhance distribution of the wireless broadband signal within the ducts of the ventilation system and between the transmitter and device receivers.

Thus, the disclosed method embodiments generally include steps of selecting, optimizing, implementing or otherwise setting a configuration parameter of one or multiple base antennas. The configuration parameter may be, but is not limited to a physical antenna parameter such as the location of the base antenna(s) or the angular orientation of the base antenna(s) with respect to a duct surface or with respect to other antennas. In addition, the configuration parameter might be a signal attribute, including but not limited to transmission signal phase, transmission signal amplitude or transmission signal preconditioning. Accordingly, the communication of the wireless broadband signal between the transmitter and the receiver(s) might be enhanced by optimizing the propagation of the wireless broadband signal within the ventilation system by optimizing the transmission mode or otherwise; optimizing de-correlation between at least two signal paths between at least two base antennas and one or more device antennas; optimizing a correlation matrix between at least two base antennas and at least two device antennas or other techniques.

In one non-limiting example, the configuration parameter of the adjusted base antenna is selected to favor a first selected hollow waveguide propagation mode. Optionally, the configuration parameter of a second adjusted base antenna is selected to favor a second selected hollow waveguide propagation mode which is different than the first selected hollow waveguide propagation mode. This type of optimization emphasizes de-correlation between the propagation modes.

The configuration parameter can be initially determined empirically and an initial antenna placement or signal attribute may be optimized based upon the initial determination. Optionally or additionally, the initial configuration parameter can be adjusted, supplemented or otherwise modified based upon a signal parameter of the wireless broadband signal as actually received by the receiver. The foregoing empirical and feedback-based optimization strategies can be implemented in conjunction with each other and may be implemented once, several times or continuously.

Alternative embodiments disclosed herein include building-based communications systems including a ventilation system having ducts and openings within a building, one or multiple receiver devices with one or more device antennas and a transmitter operatively associated with multiple base antennas. In the system embodiments, the base antennas, or the transmitter itself, are inserted into one or more ducts of the ventilation system. The transmitter is therefore configured to communicate by means of a wireless broadband signal through the multiple base antennas to one or more receivers with the conducting walls of the ventilation system operating as waveguides. The system embodiments may be used to implement the configuration parameter selection and optimization techniques noted above to enhance communication of wireless broadband signals between the transmitter and a receiver.

In certain system embodiments the selection or optimization of a configuration parameter is implemented autonomously or semi-autonomously. Is such an embodiment, the system will also include a processor and a non-transitory machine readable medium encoding a set of instructions executable by the processor to perform various steps of the methods noted above.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Figure 1:
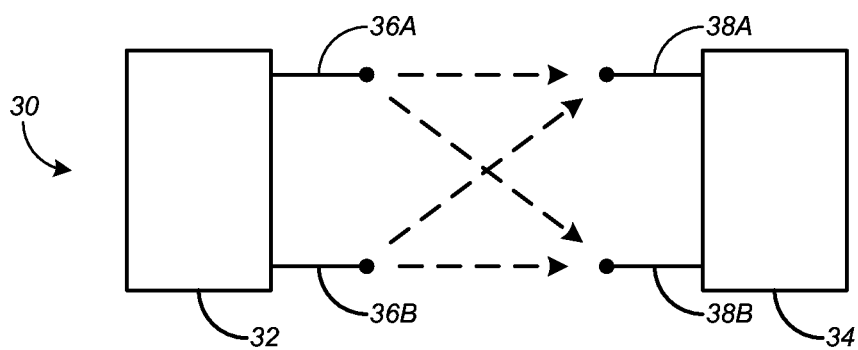
FIG. 1 is a schematic diagram illustrating a simple prior art MIMO system.

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

I. General System and Method Description

One set of embodiments includes systems and methods that provide for the effective distribution of broadband wireless signals within a building. In general, the embodiments disclosed herein feature the distribution of broadband wireless signals in part through the heating, ventilation and air-conditioning (HVAC) system of a building. A typical HVAC system includes extensive ductwork, air inlets, air outlets, fans, heaters, air conditioners, humidifiers, dehumidifiers and other apparatus designed to condition and move air throughout a building. All of the foregoing elements are collectively referred to herein as a ventilation system. The ducts of a building ventilation system can be adapted for use as hollow waveguides as described in detail below.

In addition to leveraging the ventilation system of a building as a system of hollow waveguides, the disclosed embodiments feature the use of multiple antenna technology. These two separate technologies are synergistic. In particular the use of a building ventilation system as a system of hollow waveguides provides for unique optimization strategies which cannot be replicated with normal, non-waveguided multiple antenna transmissions.

The disclosed system embodiments will include at least one wireless access point (WAP), repeater or other device including a transmitter. The transmitter will be associated with multiple antennas. These antennas are referred to herein as "base" antennas since the transmitter is conveniently described as the base station of a wireless network. The base antennas are positioned within the building ventilation system as described in detail below. The transmitter communicates wirelessly with any number of wireless devices positioned in various rooms or spaces throughout the building. These wireless devices also include one or more antennas. The antennas associated with wireless devices are referred to herein as "device" antennas to avoid confusion with the base antennas. It is important to note however that typical wireless communication includes both uplink and downlink components. Thus, the transmitter is configured to both transmit and receive wireless signals through the base antennas and each device is configured to both transmit and receive wireless signals through one or more device antennas.

The disclosed systems and methods feature the initial selection of, and potentially the modification of, a configuration parameter of at least one base antenna to enhance communication of the wireless broadband signal from the transmitter through the ventilation system to one or more receivers. As defined herein a configuration parameter can relate to a physical aspect of a base antenna or an attribute of the transmitted signal. For example, an antenna configuration parameter can be, but is not limited to, a selected physical location of an antenna with respect to a duct surface or another antenna. Similarly, a configuration parameter may be the angular orientation of the antenna with respect to a duct surface or another antenna. A configuration parameter may also relate to a transmitted signal attribute and can be but is not limited to the wireless signal phase or the wireless signal amplitude.

As noted above, the disclosed embodiments feature enhanced communication of a wireless broadband signal from the transmitter to a receiver. Signal or transmission enhancement may occur through one or multiple means, including but not limited to; optimizing the propagation of the wireless broadband signal within the ventilation system, optimizing de-correlation between at least two signal paths between base and device antennas or optimizing a correlation matrix between multiple base antennas and multiple device antennas. Each of the above methods of signal communication enhancement is discussed in detail herein.

II. Waveguide Transmission Modes

The properties of electromagnetic waves propagating in hollow conducting waveguides having rectangular or circular cross-sections are well-known. The ducts found in a typical building ventilation system usually have circular or rectangular cross-sections. Therefore, one method of optimizing the propagation of wireless broadband signals propagating within a ventilation system includes placing or orienting multiple base antennas to favor one or more transmission or propagation modes.

TE modes (transverse electric) have no electric field in the direction of propagation. TM modes (transverse magnetic) have no magnetic field in the direction of propagation. In rectangular waveguides, mode numbers are designated by two suffix designations attached to the mode type, in the form $TE_{mn}$, where m is the number of half-wavelengths across the width of the waveguide and n is the number of half-wavelengths across the height of the waveguide. In circular waveguides, circular modes exist. Circular mode numbers are also designated in the form $TE_{mn}$ but here m is the number of half-wavelengths along a half-circumference and n is the number of half-wavelengths along a radius.

Waveguide propagation modes depend upon the operating wavelength and the size and shape of the guide. Each mode is characterized by a cutoff frequency below which the mode cannot exist in the guide. For example, the cutoff frequency of a rectangular waveguide may be calculated according to the following formula:

$$f_{c_{mn}} = \frac{1}{2\sqrt{\mu\varepsilon}} \sqrt{\left(\frac{m}{a}\right)^2 + \left(\frac{n}{b}\right)^2} \quad (1)$$

Where (a) is the width of the waveguide and (b) is the height of the waveguide. Waves having frequencies above the cutoff frequencies of more than one mode can propagate in multiple modes.

Field representations of selected TE and TM modes possible in a rectangular or circular waveguide having conducting walls are well known. As noted above, in both rectangular and circular cross-section waveguides, the parameter which determines the cutoff frequency for a given mode is the width or diameter of the waveguide/duct. Thus, the maximum wavelength for a given signal transmitted in a specific duct can be calculated. More importantly, as detailed below, transmissions at suitably higher frequencies can be coupled to a duct waveguide in a specific manner to induce higher order modes which can enhance signal transmission through a somewhat convoluted and varying duct system.

II. Multiple Antenna Technologies

In conjunction with optimization to favor one or more transmission modes, configuration parameters may be adjusted to optimize the transmission relationship between multiple base antennas and one or more device antennas.

Thus, the disclosed systems and methods feature the use of multiple base antennas associated with the transmitter and one or multiple antennas associated with each receiver to enhance communications between a WAP and wireless device. One such multiple antenna system is multiple input/multiple output (MIMO). MIMO technologies offer significant increases in data throughput and link range without additional bandwidth or increased transmit power.

Figure 3:
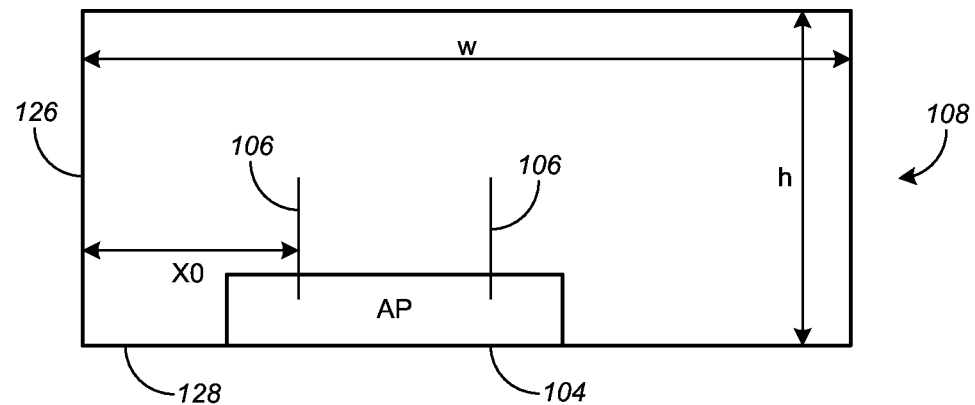
FIG. 3 is a schematic diagram illustrating the transmitter, antenna and duct portions of a system providing for optimized wireless communication within a building, in accordance with various embodiments.

In a MIMO system the transmitter sends multiple streams from multiple base antennas. The transmitted streams define a number of paths between the base antennas at the transmitter and the device antennas at the receiver. The transmit streams may be represented as a matrix as illustrated in FIG. 1, a simple MIMO system 30 having a transmitter 32 with two base antennas 36A, 36B and receiver 34 with two device antennas 38A, 38B which together define four transmission paths. System throughput is in a MIMO system is multiplied nearly linearly with every additional antenna. For example a 2×2 MIMO system as shown in FIG. 3 will approximately double throughput. Full throughput enhancement in a MIMO system is only achieved however, if the additional antennas transmit in uncorrelated Rayleigh fading channels. Thus, most effective MIMO transmission requires that the paths between antennas be de-correlated Path de-correlation is thus a very useful characteristic for a MIMO system. De-correlation increases the rank of the system, which can be estimated theoretically, and tweaked and optimized empirically. This is particularly useful since many standards, for example Wi-Fi 802.11n, 802.11ac and LTE define parameters that can be used to measure MIMO de-correlation and system rank, which can be used actively to place antennas optimally or refine antenna placement.

MIMO performance is also dependent on good channel prediction for optimal preconditioning, and rank estimation. The disclosed methods and systems have an advantage because modes propagating in a duct are linked to the physical setup of the duct work, and therefore vary little over time.

Certain systems described in more detail below feature base antennas which are not necessarily close to each other, or possibly not on the same duct cross-section. Macro-diversity within a multiple antenna system can be achieved with antennas cabled into different duct locations. The ducting and vent placement then contributes to the different propagation characteristics for the overall system.

IV. Specific Method and System Embodiments

Figure 2:
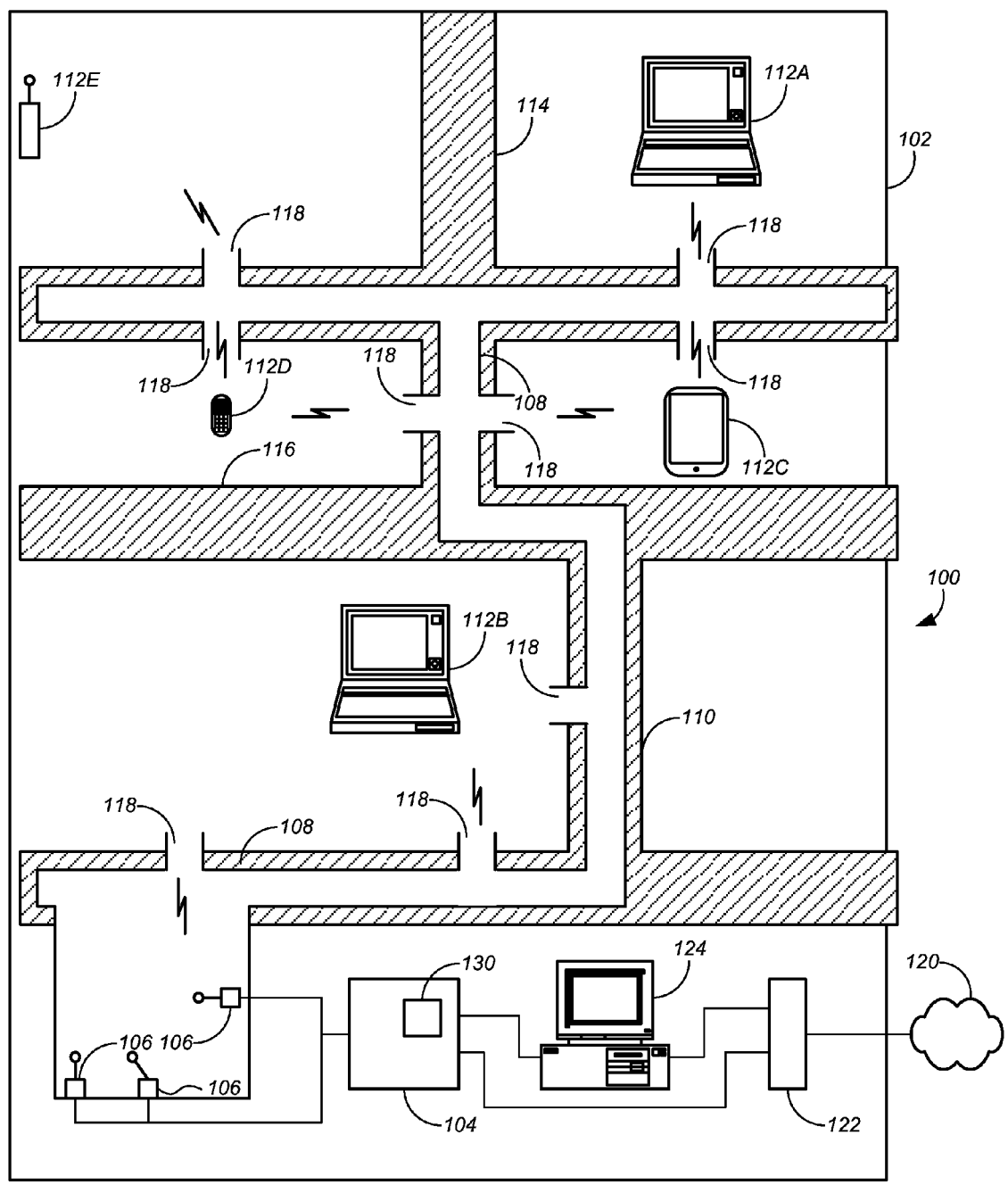
FIG. 2 is a schematic diagram illustrating a system providing for optimized wireless communication within a building, in accordance with various embodiments.

One embodiment is a communications system which is configured to use a building ventilation system as a system of waveguides thus enhancing the quality of wireless broadband coverage within the building. For example, FIG. 2 schematically illustrates a communications system 100 located within a building 102. The communications system includes at least one transmitter 104. The transmitter 104 can be, but is not limited to, a wireless access point (WAP) such as a wireless router. The transmitter could be a Wi-Fi hotspot, a base station, a cellular repeater, a small cell, a distributed antenna system (DAS), nodes of a heterogeneous network (HetNet), or another device which transmits data over radio frequencies. The transmitter 104 is thus enabled to transmit a radio frequency signal according to an IEEE standard. For example the transmitter 104 may transmit a wireless broadband signal according to the 802.11a/b/g/n, 802.11ac, LTE, or LTE Advanced, 802.16 WiMAX, 802.20 MBWA or other standards.

It may be noted from FIG. 2 that the transmitter 104 is associated with and transmits through multiple base antennas 106. Furthermore, the base antennas 106 are inserted into or within one or more ducts 108 of the ventilation system 110 of the building 102. The communications system 100 also includes one or more receivers 112. A receiver 112 is defined as any wireless device configured to communicate wirelessly with the transmitter 104. Thus the receiver 112 could be a personal computer 112A, laptop computer 112B, tablet computer 112C, a cell phone or smart phone 112D, a PDA, a smart thermometer 112E, a television, video player or recording device, a smart appliance, and alarm system, a printer, a copier, a fax machine or any other device configured to receive and transmit wireless broadband communications.

As shown on FIG. 2, the receivers 112 may be distributed throughout the building 102 with any number of walls 114, floors 116 or ceilings position between a given receiver 112 and the transmitter 104 and antenna 106. Broadband wireless signals transmitted from the transmitter 104 and antenna 106 are at least in part guided through the ventilation system 110 by the ducts 108 acting as hollow waveguides. The ducts 108 may in certain instances be leaky waveguides which allow a portion of the wireless signal to pass outside of the ducts through the duct walls. More typically however, as shown in FIG. 2, the ventilation system 110 will include multiple vents 118 or other openings providing for air exchange with the various rooms of the building 102. Two-way wireless communication may occur between the transmitter 104 one or more receivers 112 through the vents 118 of the ventilation system 110.

As also illustrated on FIG. 2, the transmitter 104 is typically connected to at least one wired network 120 which may be located inside of or outside of the building 102. Typically, the transmitter 104 is connected to the wired network 120 with one or more electrical or optical cables and one or more intermediate devices. The wired network 120 can be any network including but not limited to a local area network (LAN), a wide area network (WAN), part of a DAS, HetNet, or small cell backhaul network, the Internet, a cellular telephone communications network or a combination of networks. For example, the transmitter 104 may be attached to a LAN which is then attached to the Internet through a dedicated data communications line, a DSL modem 122, a cable modem or other supplemental infrastructure. The system 100 may include any number of supplemental or peripheral elements including but not limited to a computer 124 in wired communication with the system 100.

Figure 4:
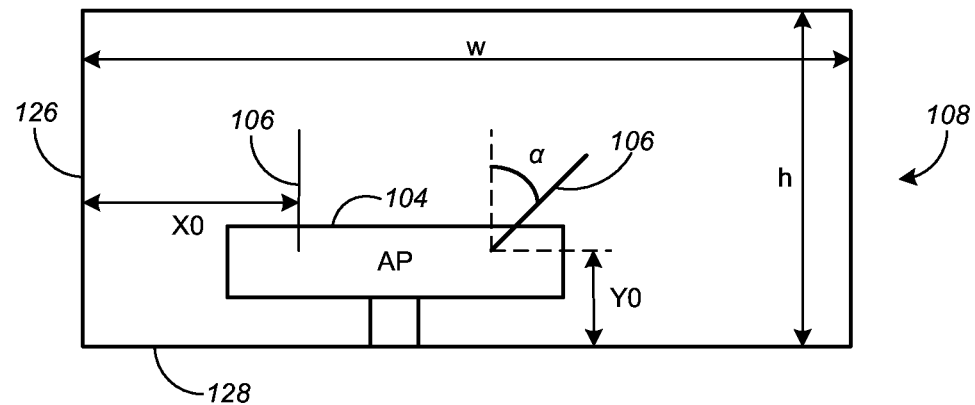
FIG. 4 is a schematic diagram illustrating an alternative configuration of the transmitter, antenna and duct portions of a system providing for optimized wireless communication within a building, in accordance with various embodiments.
Figure 5:
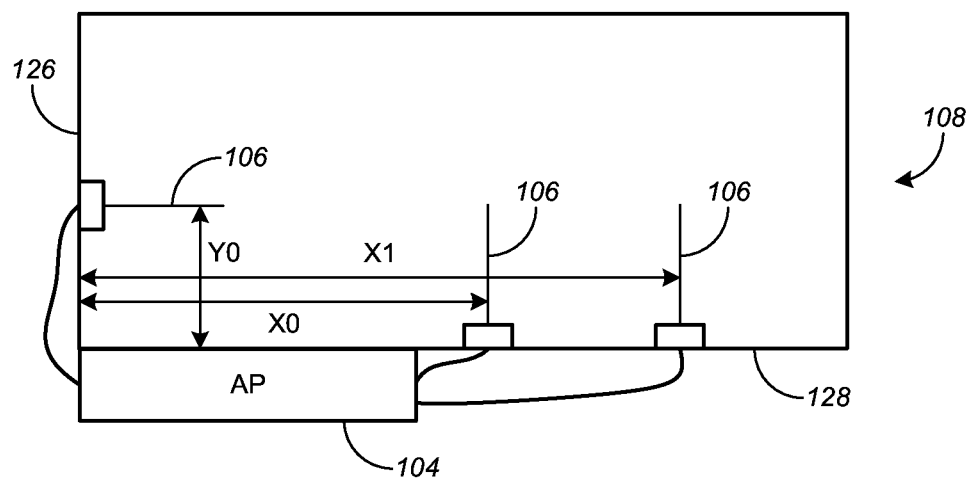
FIG. 5 is a schematic diagram illustrating an alternative configuration of the transmitter, antenna and duct portions of a system providing for optimized wireless communication within a building, in accordance with various embodiments.

In FIG. 2 the transmitter 104 is shown placed outside of a portion of the ventilation system 110. This configuration is not limiting. As alternatively shown in FIG. 3 and FIG. 4, the transmitter 104 may be located inside of a duct 108 or other element of a building ventilation system 110 along with multiple base antennas 106. See also FIG. 5 for a more detailed view of a transmitter placed outside of a portion of the ventilation system 110. Specific strategies for locating the base antennas 106 to enhance communication of the wireless broadband signal from the transmitter to the receiver are described in detail below.

As noted above, each base antenna can be described as having several configuration parameters. Antenna configuration parameters include, but are not limited to, the physical location of a base antenna within a duct or with respect to other base antennas. Alternatively, the angular orientation of a base antenna with respect to a duct surface or another antenna is a configuration parameter. In addition, certain characteristics of the RF signal transmitted from a base antenna can be modified. These signal modifications are also antenna configuration parameters. Signal characteristics which can be modified include transmission signal phase and transmission signal amplitude. In addition, preconditioning parameters can be applied to the signal. Preconditioning is useful in optimizing the sending of multiple signals encoding independent data streams over different antennas. Generally, preconditioning consists in sending linear combinations of the signals, rather than the signals themselves, these linear combinations can be optimized for the various propagation characteristics of the propagation paths.

As detailed below, initial selection or subsequent adjustment of one or more antenna configuration parameters may be used to enhance communication of the wireless broadband signal from the transmitter to a receiving device. Initially, it may be noted from FIGS. 3-5 that a given base antenna 106 may be located at a select distance $X_0$ from a vertical duct wall 126 or a select distance $Y_0$ from a horizontal duct wall 128. In addition the distance between selected base antennas 106 may be varied in any direction. Furthermore, the angular orientation a of one or more base antennas 106 may be varied with respect to the angular orientation of other antennas or the duct walls. Although illustrated with respect to a representative duct having a rectangular cross-section, the foregoing general concepts are equally applicable to ducts having a circular cross-section.

The selection or modification of antenna configuration parameters can enhance communication of the wireless broadband signal in one or more complementary ways. As noted above, and described in detail below, the selection and placement of multiple base antennas can facilitate the propagation of the wireless signal in one or more higher order TE or TM modes which are better suited for propagation through a somewhat convoluted ventilation system 110. In addition, base antenna selection and placement can facilitate the correlation between at least two signal paths and/or optimize a correlation matrix between multiple base antennas and multiple device antennas.

In a typical waveguide, the exact placement of excitation is a matter of impedance matching. In a wireless system, the placement of the antenna monopole follows similar rules plus the need to consider the generation or optimization of propagating modes. It may be noted that in a multiple antenna system, placement and spacing affects modes; modes are somewhat orthogonal, which add to de-correlation, which is important to MIMO. The amplitude/phase choices may be setup as in a smart antenna, with a feedback mechanism that allows for optimal choice. The feedback mechanism can be a very complex iterative process in MIMO.

In view of the foregoing discussion of modal field distribution, the following rules may be stated for optimal antenna placement in a rectangular waveguide such as a duct.

Place antennas a distance of a/m apart when in opposite phase.
Place antennas a distance of a/(2m) away from a metallic duct wall when in opposite phase.
Place antennas a distance of (2a)/m apart when in phase.
Place antennas a distance of a/(2m) away from a metallic duct wall when in phase.
Where (a) is the width of the duct and m is the desired transverse electric mode.

As noted above, the selection or modification of antenna configuration parameters can enhance broadband signal transmission in more than one complementary way. Thus, in addition to the use of multiple base antennas as described above to excite desirable transmission modes, the multiple base antennas can be configured to promote de-correlation between transmission paths between multiple base and device antennas. De-correlation increases the rank of the system, which can be estimated theoretically, and adjusted or optimized empirically. This is particularly useful since many standards, for example Wi-Fi 802.11n, 802.11ac and LTE define parameters that can be used to measure MIMO de-correlation and system rank, which can then be used to place antennas optimally or refine antenna placement.

As an alternative to empirical antenna placement optimization, optimized placement may be accomplished through an iterative trial and error process, in recognition of the imperfections of the ducts and branches, and difficulty or impossibility with full analysis of a given signal path. A combination approach may be utilized as well, where initial antenna placement within a duct system is selected based upon modal analyses, with optimal positions then being refined through an iterative trial and error process using feedback from the communication between the transmitter and selected devices. Thus, in a selected implementation, the antennas can be left at a pre-calculated position, or a received signal may be utilized to move and orient one or more antennas to reach an optimal reading.

A system can also be devised where antennas are not necessarily close, or on the same duct cross section. Macro-diversity of the multiple antenna system can be achieved with antennas cabled into different duct locations. The ducting and vent placement then contributes to the different propagation characteristics of the MIMO system.

Figure 6:
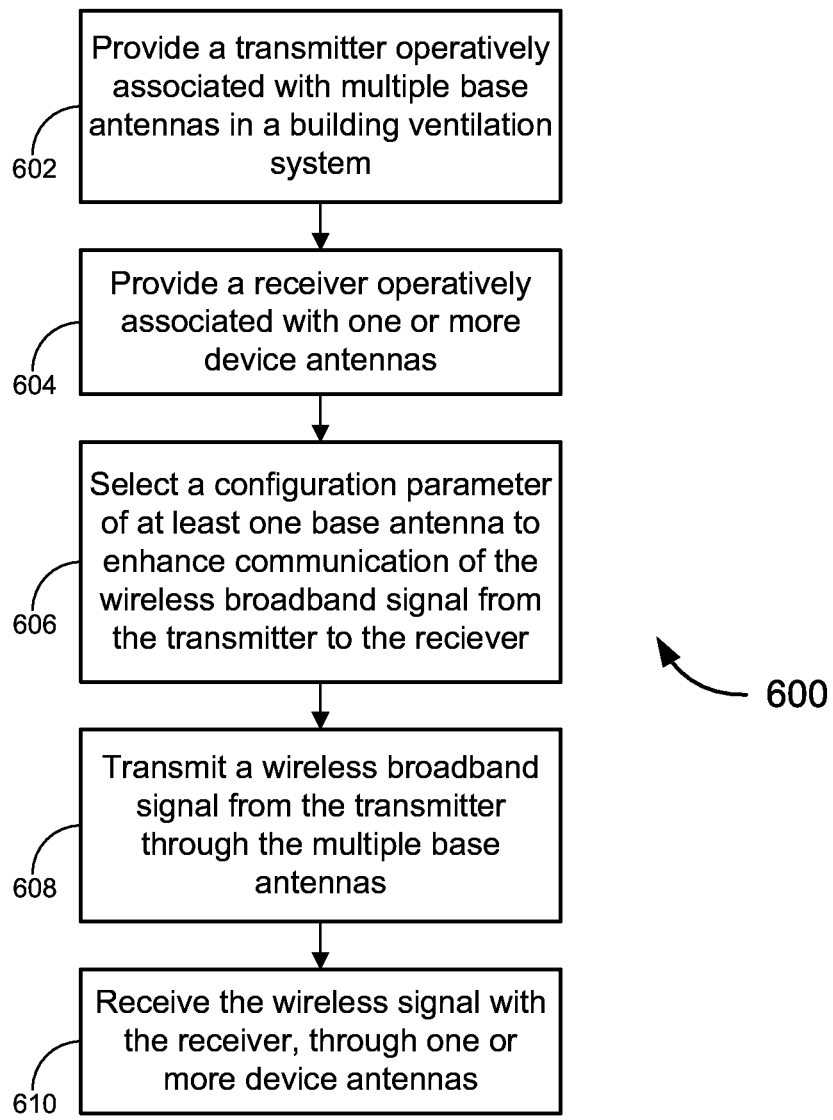
FIG. 6 is a process flow diagram illustrating a method of providing optimized wireless communication within a building, in accordance with various embodiments.

Alternative embodiments include methods of distributing a broadband wireless signal in a building. For example, one representative method 600 is illustrated in the flowchart of FIG. 6. The method 600 is initiated by providing a system which includes a transmitter operatively associated with multiple base antennas where the base antennas are placed within a building ventilation system (step 602). In addition, at least one receiver operatively associated with one or more device antennas is provided within the building (step 604). The method further includes initially selecting or manipulating a configuration parameter of at least one base antenna to enhance communication or transmission of the wireless broadband signal from the transmitter to the receiver (step 606). Selecting or manipulating a configuration parameter can include but is not limited to, selecting a physical placement location for a base antenna, selecting an antenna orientation, selecting an initial transmission signal phase or selecting an initial transmission signal amplitude.

The method 600 may optionally further include transmitting a wireless broadband signal from the transmitter through the multiple base antennas (step 608) and receiving the wireless broadband signal with the receiver through one or more device antennas (step 610).

Figure 7:
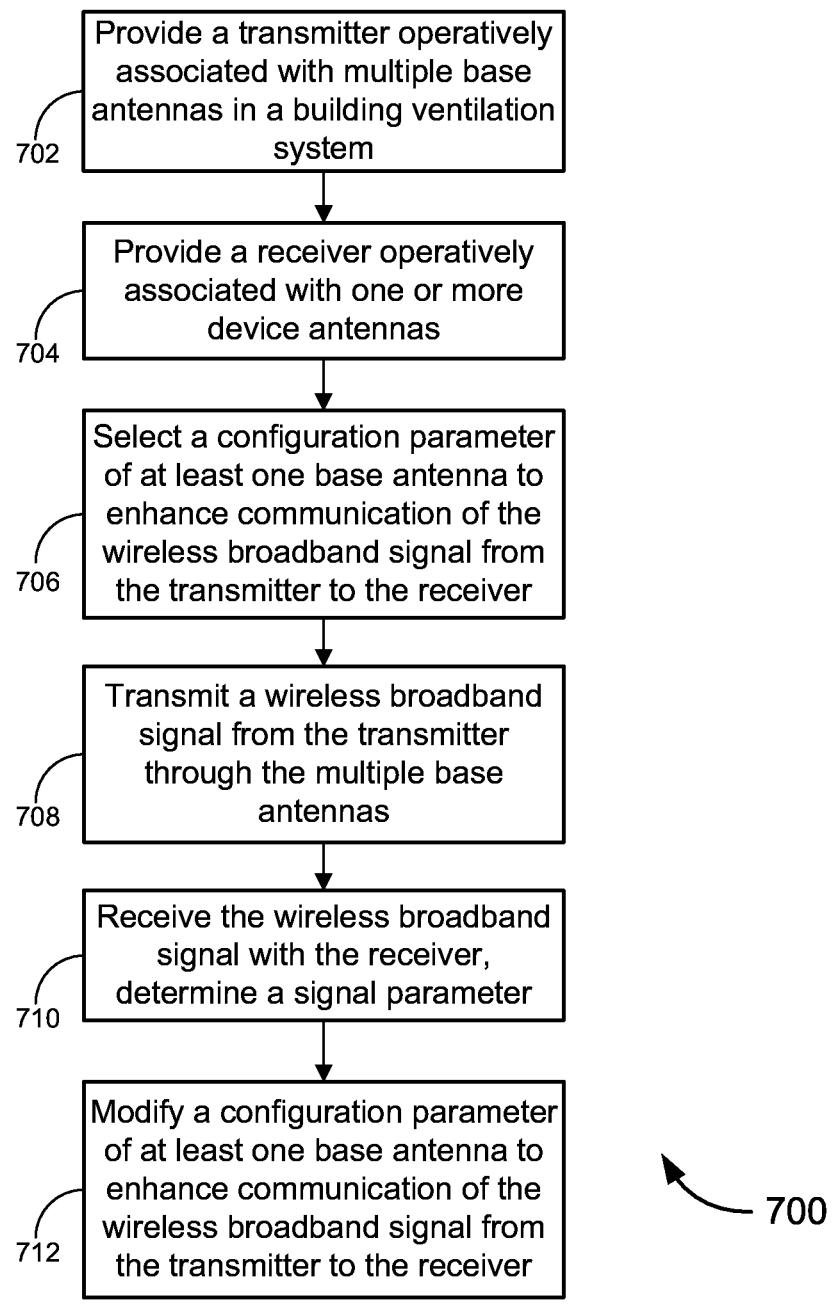
FIG. 7 is a process flow diagram illustrating an alternative method of providing optimized wireless communication within a building, in accordance with various embodiments.

An alternative method 700 is illustrated in FIG. 7. The method 700 is initially the same as the method 600, thus steps 702, 704, 706 and 708 correspond to steps 02-608 above. At step 710 however, the method 700 includes the step of analyzing a received signal to determine a signal parameter. Analysis can be performed on any signal attribute including but not limited to, signal or subcarrier power level, signal or subcarrier signal-to-noise ratio, signal or subcarrier throughput, signal or subcarrier latency or other parameters. Analysis can be formed upon a subcarrier actively carrying data or communication symbols or packets or analysis can be performed upon a dedicated pilot subcarrier. Alternatively, analysis can be performed on the subcarriers of a dedicated training sequence.

Signal analysis can be provided by a dedicated device such as a spectrum analyzer for signal analysis can be provided in a module associated with a wireless receiver, the transmitter or elsewhere. In any case, signal analysis will typically be provided by a processing device 130 as described in more detail below. The processing device 130 is illustrated in FIG. 2 as being associated with the transmitter 104. If the processing device 130 is not directly associated with the transmitter 104, the results of signal analysis may be conveyed to the transmitter 104.

Upon the receipt or generation of the results of signal analysis, the method 700 may further include step 712, modifying a configuration parameter of at least one base antenna to enhance communication of the wireless broadband signal from the transmitter to the receiver. The configuration parameter is thus modified in accordance with the determined signal parameter to enhance the signal. Modification can occur automatically, if the signal parameter is one which can be controlled by the processing device 130; signal phase or amplitude for example. Alternatively, modification can occur as directed by the processing device 130 with any necessary user intervention. For example, a user could be directed to move the location of one or more base antennas or adjust the angular orientation of one or more base antennas.

Steps 710 and 712 may be repeated periodically or continuously if desired to account for temporary or long-term changing conditions within the transmission environment.

Figure 8:
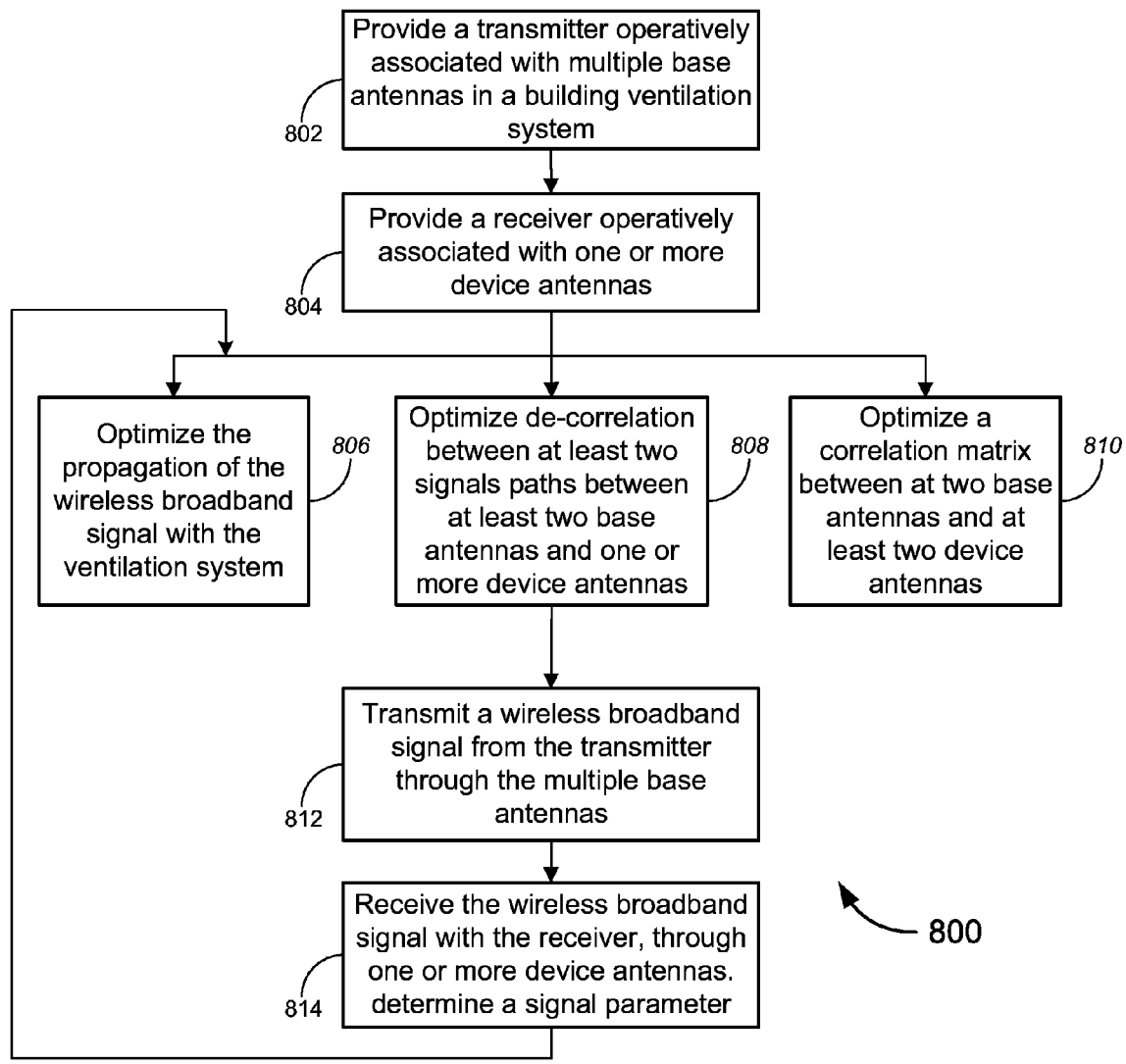
FIG. 8 is a process flow diagram illustrating an alternative method of providing optimized wireless communication within a building, in accordance with various embodiments.

FIG. 8 illustrates a method 800 which expands upon methods 600 and 700. In particular, method 800 details that steps 606 and 706 may be implemented with one or more alternative and complementary optimization strategies. For example the method 800 may include optimization of the propagation of the wireless broadband signal within the ventilation system (step 806). Propagation optimization may include but is not limited to selecting or modifying an antenna configuration parameter to favor one or more transmission modes. The method 800 may also include optimization of the de-correlation between at least two signal paths or the optimization of a correlation matrix between at least two base antennas and at least two device antennas, (steps 808 and 810 respectively). It is important to note that the described optimization strategies and other optimization strategies are complementary and not mutually exclusive.

Figure 9:
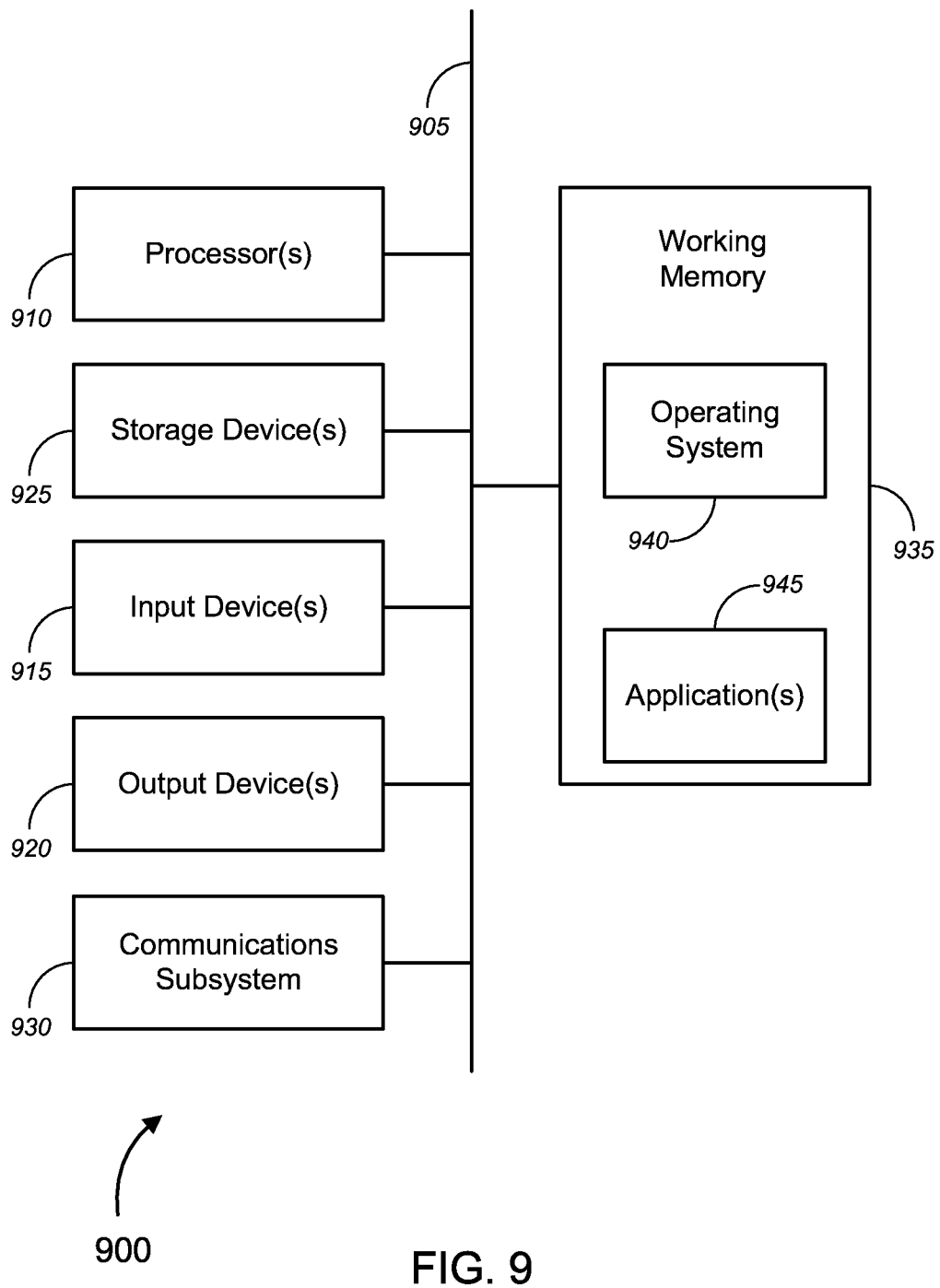
FIG. 9 is a schematic diagram illustrating a processing system, in accordance with various embodiments.

As noted above, certain signal analysis and processing steps may be implemented with a processing device 130. The processing device may be included within a stand-alone spectrum analyzer. Alternatively the processing device 130 may be included within or associated with a wireless device 112 or the transmitter 104. FIG. 9 provides a schematic illustration of one embodiment of a processing device 900 that can be located as described above to perform the methods provided by various other embodiments, as described herein. It should be noted that FIG. 9 is meant only to provide a generalized illustration of various components, of which one or more (or none) of each may be utilized as appropriate. FIG. 9, therefore, broadly illustrates how individual system elements may be implemented in a relatively separated or relatively more integrated manner.

The processing device 900 is shown comprising hardware elements that can be electrically coupled via a bus 905 (or may otherwise be in communication, as appropriate). The hardware elements may include one or more processors 910, including without limitation one or more general-purpose processors and/or one or more special-purpose processors (such as digital signal processing chips, graphics acceleration processors, and/or the like); one or more input devices 915, which can include without limitation a mouse, a keyboard and/or the like; and one or more output devices 920, which can include without limitation a display device, a printer and/or the like.

The processing device 900 may further include (and/or be in communication with) one or more storage devices 925, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The processing device 900 might also include a communications subsystem 930, which can include without limitation a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 930 may permit data to be exchanged with a network (such as the network described below, to name one example), with other computer systems, and/or with any other devices described herein. In many embodiments, the processing device 900 will further comprise a working memory 935, which can include a RAM or ROM device, as described above.

The processing device 900 also may comprise software elements, shown as being currently located within the working memory 935, including an operating system 940, device drivers, executable libraries, and/or other code, such as one or more application programs 945, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 925 described above. In some cases, the storage medium might be incorporated within a computer system. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the processing device 900 and/or might take the form of source and/or installable code, which, upon compilation and/or installation on the processing device 900 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the processing device 900) to perform methods in accordance with various embodiments of the invention. According to a set of embodiments, some or all of the procedures of such methods are performed by the processing device 900 in response to processor 910 executing one or more sequences of one or more instructions (which might be incorporated into the operating system 940 and/or other code, such as an application program 945) contained in the working memory 935. Such instructions may be read into the working memory 935 from another computer readable medium, such as one or more of the storage device(s) 925. Merely by way of example, execution of the sequences of instructions contained in the working memory 935 might cause the processor(s) 910 to perform one or more procedures of the methods described herein.

The terms "machine readable medium" and "computer readable medium," as used herein, refer to any medium that participates in providing data that causes a machine to operation in a specific fashion. In an embodiment implemented using the processing device 900, various computer readable media might be involved in providing instructions/code to processor(s) 910 for execution and/or might be used to store and/or carry such instructions/code (e.g., as signals). In many implementations, a computer readable medium is a non-transitory, physical and/or tangible storage medium. Such a medium may take many forms, including but not limited to, non-volatile media, volatile media, and transmission media. Non-volatile media includes, for example, optical and/or magnetic disks, such as the storage device(s) 925. Volatile media includes, without limitation, dynamic memory, such as the working memory 935. Transmission media includes, without limitation, coaxial cables, copper wire and fiber optics, including the wires that comprise the bus 905, as well as the various components of the communication subsystem 930 (and/or the media by which the communications subsystem 930 provides communication with other devices). Hence, transmission media can also take the form of waves (including without limitation radio, acoustic and/or light waves, such as those generated during radio-wave and infrared data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 910 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the processing device 900. These signals, which might be in the form of electromagnetic signals, acoustic signals, optical signals and/or the like, are all examples of carrier waves on which instructions can be encoded, in accordance with various embodiments of the invention.

The communications subsystem 930 (and/or components thereof) generally will receive the signals, and the bus 905 then might carry the signals (and/or the data, instructions, etc. carried by the signals) to the working memory 935, from which the processor(s) 905 retrieves and executes the instructions. The instructions received by the working memory 935 may optionally be stored on a storage device 925 either before or after execution by the processor(s) 910.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method of distributing a broadband wireless signal in a building comprising:
   providing a transmitter operatively associated with multiple base antennas, the base antennas being inserted into one or more ducts of a ventilation system of a building;
   providing a receiver operatively associated with one or more device antennas; and
   selecting a configuration parameter of a first base antenna to favor a first selected hollow waveguide propagation mode; and
   selecting a configuration parameter of a second base antenna to favor a second selected hollow waveguide propagation mode which is different than the first selected hollow waveguide propagation mode to emphasize de-correlation between the first selected hollow waveguide propagation mode and the second selected hollow waveguide propagation mode.

2. The method of claim 1 further comprising:
   transmitting a wireless broadband signal from the transmitter through the multiple base antennas; and
   receiving the wireless broadband signal with the receiver, through the one or more device antennas.

3. The method of claim 1 wherein the selected configuration parameter of the base antenna is at least one of:
   a location of the antenna,
   an angular orientation of the antenna,
   a transmission signal phase,
   a transmission signal amplitude, or
   a transmission signal preconditioning.

4. The method of claim 1 wherein the communication of the wireless broadband signal from the transmitter to the receiver is enhanced by at least one of:

optimizing the propagation of the wireless broadband signal within the ventilation system;
optimizing de-correlation between at least two signal paths between at least two base antennas and one or more device antennas; or
optimizing a correlation matrix between at least two base antennas and at least two device antennas.

5. The method of claim 1 wherein the multiple base antennas are inserted into one or more ducts having a rectangular cross section and wherein at least one antenna is associated with a vertical duct wall and at least one antenna is associated with a horizontal duct wall.

6. The method of claim 1 wherein the multiple base antennas are inserted into one or more ducts having a rectangular cross section and wherein two or more of the multiple base antennas are associated with the largest horizontal duct wall.

7. The method of claim 6 wherein the two or more base antennas associated with the largest horizontal duct wall are positioned to have different angular orientations.

8. The method of claim 1 wherein a first base antenna is inserted into a first duct section and a second base antenna is inserted into a second duct section which is physically separated from the first duct section.

9. The method of claim 2 further comprising:
determining a signal parameter of the wireless broadband signal received by the receiver; and
modifying a configuration parameter of at least one base antenna in accordance with the determined signal parameter.

10. A communications system comprising:
a ventilation system disposed within a building, the ventilation system comprising one or more ducts and one or more ventilation openings;
a receiver operatively associated with one or more device antennas;
a transmitter operatively associated with multiple base antennas, the base antennas being inserted into one or more ducts of the ventilation system, the transmitter being further configured to transmit a wireless broadband signal from the transmitter through the multiple base antennas to be received by the receiver, wherein a configuration parameter a first base antenna is selected favor a first selected hollow waveguide propagation mode and a configuration parameter of a second base antenna is selected to favor a second selected hollow waveguide propagation mode which is different than the first selected hollow waveguide propagation mode to emphasize de-correlation between the first selected hollow waveguide propagation mode and the second selected hollow waveguide propagation mode.

11. The communications system of claim 10 wherein the selected configuration parameter of the base antenna is at least one of:
a location of the antenna,
an angular orientation of the antenna,
a transmission signal phase, or
a transmission signal amplitude, or
a transmission signal preconditioning.

12. The communications system of claim 10 wherein the communication of the wireless broadband signal from the transmitter to the receiver is enhanced by at least one of:
optimizing the propagation of the wireless broadband signal within the ventilation system;
optimizing de-correlation between at least two signal paths between at least two base antennas and one or more device antennas; or
optimizing a correlation matrix between at least two base antennas and at least two device antennas.

13. The communications system of claim 10 wherein the multiple base antennas are inserted into one or more ducts having a rectangular cross section and wherein at least one antenna is associated with a vertical duct wall and at least one antenna is associated with a horizontal duct wall.

14. The communications system of claim 10 wherein the multiple base antennas are inserted into one or more ducts having a rectangular cross section and wherein two or more of the multiple base antennas are associated with the largest horizontal duct wall.

15. The communications system of claim 10 wherein a first base antenna is inserted into a first duct section and a second base antenna is inserted into a second duct section which is physically separated from the first duct section.

16. The communications system of claim 10 further comprising:
a processor; and
a non-transitory machine readable medium having encoded thereon a set of instructions executable by the processor to perform one or more operations, the set of instructions comprising:
instructions to determine a signal parameter of the wireless broadband signal received by the receiver; and
instructions to modify a configuration parameter of at least one base antenna in accordance with the determined signal parameter.

17. The communications system of claim 10 wherein the transmitter is located within a duct.

18. The communications system of claim 10 wherein the transmitter is located outside of a duct and communicates the wireless broadband signal to the antennas through conductors.

* * * * *